US006178632B1

(12) United States Patent
Worrel et al.

(10) Patent No.: US 6,178,632 B1
(45) Date of Patent: Jan. 30, 2001

(54) METHOD FOR MANUFACTURING AIR ASSIST PASSAGEWAYS FOR FUEL INSECTOR

(75) Inventors: Christine C. Worrel, Madison Heights, MI (US); Karl Robert Schwarzpech, Windsor (CA); Debora Nally, Williamsburg, VA (US)

(73) Assignee: Siemens Canada Limited, Ontario (CA)

( * ) Notice: Under 35 U.S.C. 154(b), the term of this patent shall be extended for 0 days.

(21) Appl. No.: 09/369,476

(22) Filed: Aug. 6, 1999

(51) Int. Cl.[7] ..................................................... B23P 15/00

(52) U.S. Cl. ................................. 29/888.46; 29/890.124; 29/890.127; 164/113

(58) Field of Search ............................. 29/890.08, 527.6, 29/888.46, 890.127, 890.124; 164/113, 339, 340; 123/531; 239/533.12

(56) References Cited

U.S. PATENT DOCUMENTS 5,484,108 * 1/1996 Nally ................................ 239/553.3
5,494,223 * 2/1996 Hall et al. ......................... 239/585.5
5,722,375 * 3/1998 Nally et al. ......................... 123/531
5,785,251 * 7/1998 Wood et al. ...................... 239/417.3

* cited by examiner

*Primary Examiner*—I. Cuda

(57) ABSTRACT

A method of making air assist passageways and injector pockets in a manifold or air assist rail includes providing a mold that can open and close with several bosses extending from an inside surface. These bosses are arranged in a row and define the inside of the injector pockets when the mold is filled. The air assist passageway that couples the fuel injector pockets is provided by inserting a long pin that passes through the row of injector pocket bosses inside the mold cavity. When the cavity is filled with molten material and solidifies, the pin is withdrawn, leaving a long air assist passageway extending between the injector pockets. The mold is then opened, pulling the injector pocket bosses out of the now-formed injector pockets. The resulting structure is a row of injector pockets in a manifold or air assist rail into which injectors can be inserted, that are connected by a long air assist passageway. Since the pins were inserted through the mold and into the injector pocket bosses, when the pin is withdrawn, holes will be left at the end of the air assist passageways. These holes in the part can be later plugged or capped to prevent air from leaking out of the air assist passageways. The air assist passageway pin preferably intersects the injector pocket bosses in the middle, thereby being supported on all sides by each boss it passes through.

15 Claims, 8 Drawing Sheets

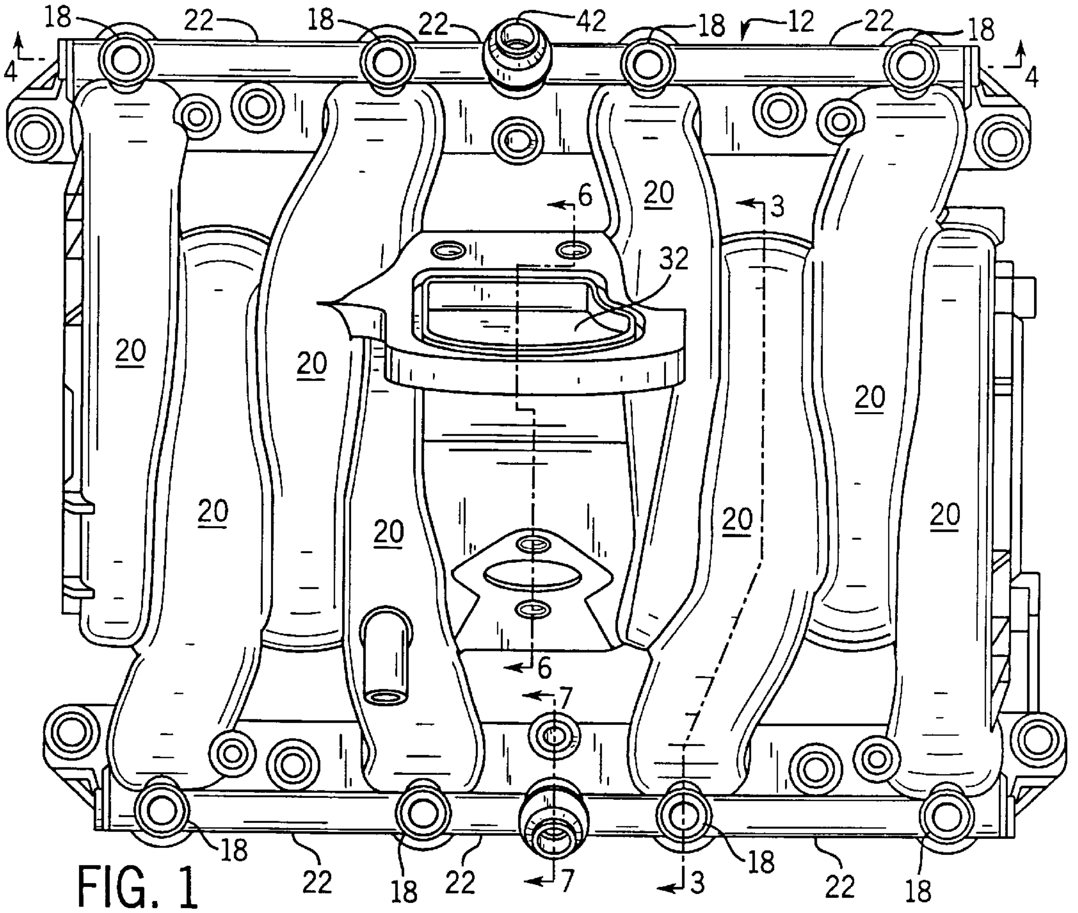
FIG. 1
FIG. 2
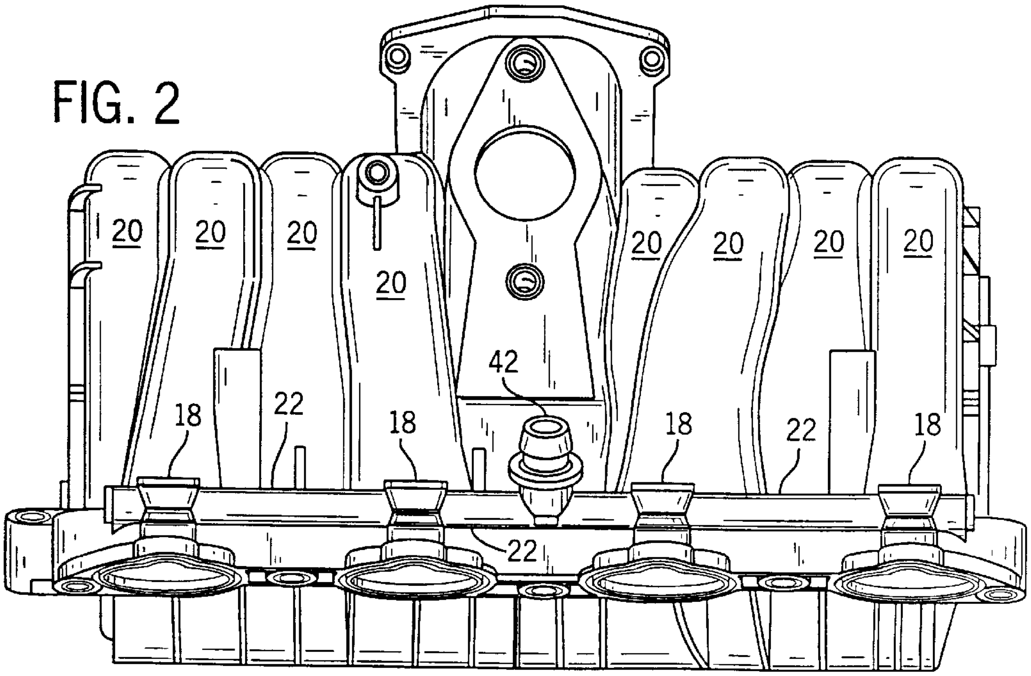

FIG. 3
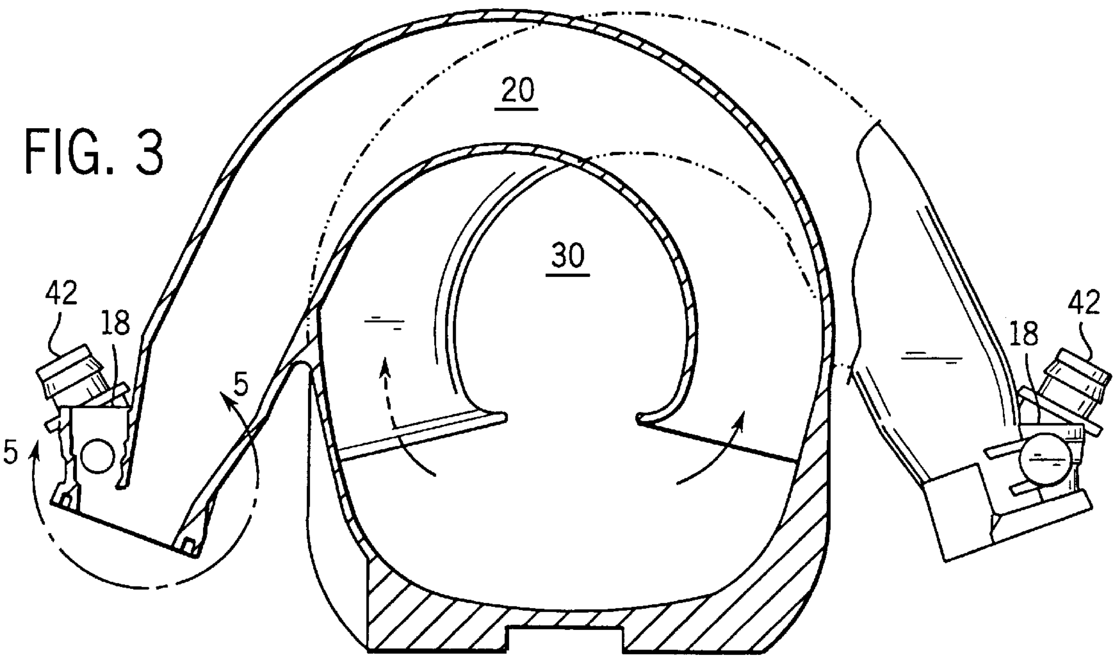
FIG. 4
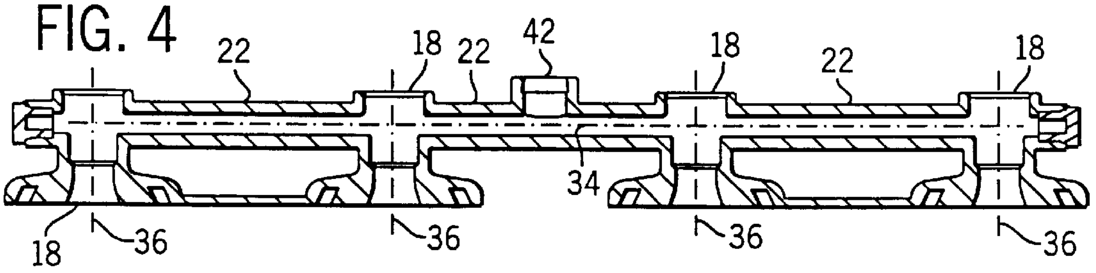
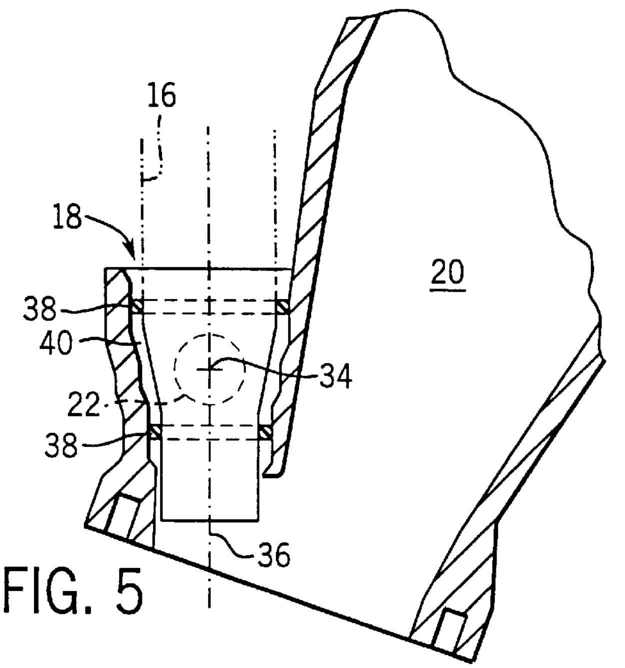
FIG. 5

METHOD FOR MANUFACTURING AIR ASSIST PASSAGEWAYS FOR FUEL INSECTOR

FIELD OF THE INVENTION

This application is an application for patent which relates to air intake systems for internal combustion engines, particularly internal combustion engines for automobiles. More particularly, it relates to intake manifolds and air assist rails and methods for making the same.

BACKGROUND OF THE INVENTION

Fuel injectors are often designed to use air under pressure to assist the atomization of fuel by the injectors. Since each injector in an engine requires air assist, each injector is connected to a supply of pressurized air.

Traditionally, since the injectors are in predetermined positions with respect to each other, the air is supplied to a bank of injectors by an external pod or rail. This pod is rigid and is attached to a row of injectors along a single bank. Thus, for in-line engines, there would be a single pod that extends the length of the engine connecting to all the cylinders. For engines with two banks of cylinders, such as "V"-type engines or horizontally opposed pancake engines, two pods are provided where each pod is connected to the injectors for a single bank of cylinders. In another arrangement, the air assist passageway is not provided by an external pod, but is formed as a passageway internal to the intake manifold.

While the external pod requires additional piping and connections for each of the injectors, it also permits a passageway with optimum air pressure and air distribution. It also permits the intake manifold and cylinder head geometry to be kept simple.

Air assist passageways formed internal to the manifold are significantly constrained in their design. For example, they are either molded using pins, or are formed by gun-drilling the manifold after it is molded. As a result, the air assist passageways typically have a circular cross section with a relatively constant cross sectional area, and a straight longitudinal axis. Their diameter is typically limited to fit between and around the injector pockets and the air induction ports for each cylinder. The longitudinal axes of the air assist passageways formed in the manifold are typically offset to one side of the fuel injector pockets such that they intersect the air injector pockets on one side.

These constraints cause several problems. First, there are significant air assist pressure drops from injector to injector as the assist air travels the length of the air assist passageway. Second, when the injectors operate, they generate pressure pulses that travel down the air assist passageways. Depending upon the geometry of the air assist passageways, these pressure pulses may cause injectors to be starved for assist air, or alternatively have too much assist air applied to the injectors. This is commonly called "cross-talk" between injectors and negatively affects the atomization of the fuel. In addition, fuel from an upstream injector can be introduced into the air assist passageways and can be transmitted to neighboring air injectors. Third, the drilling process for forming air assist passageways leaves metal or plastic particles as well as thin flanges of metal where the air assist passageways intersect the injector pockets that can break off during operation and damage the engine. Finally, in the process of molding offset air assist passageways, the pins forming the air assist passageways can be easily deflected away from injector pocket bosses. This leaves a gap between the pins and the bosses that can be filled with the molded material thus blocking the flow of air from the air assist passageway to the fuel injector pocket.

The problems are compounded by supplying assist air to an end of the internal air assist passageway. Typically, a connection is provided on one end of the air assist passageway into which the assist air is supplied. Thus, for example, the air assist passageways on a V-8 engine (having two banks of four cylinders) would be fed from an air line connected to an end of the air assist passageway. To reach the fuel injector at the far end of the engine, the passageway would have to pass three fuel injectors, all of them introducing pressure pulsations into the system that would affect the end cylinder. In a straight six-cylinder engine, the air assist passageway would pass five fuel injectors before reaching the last fuel injector in the bank of cylinders. Five fuel injectors introduce their pressure pulsations into the air assist passageway that would affect that last fuel injector.

What is needed therefore is an improved method and apparatus for supplying assist air to an engine having a plurality of fuel injectors. It is an object of this invention to provide such an apparatus and method.

SUMMARY OF THE PRESENT INVENTION

In accordance with a first embodiment of the invention, a method of manufacturing air assist passageways and injector pockets is provided including the steps of providing first and second closeable and openable mold portions configured to define an outer surface of an air assist passageway and injector pockets, wherein the air assist passageway extends between and couples the injector pockets and further wherein the second mold portion has a plurality of inwardly extending bosses defining an inner surface of each of the plurality of injector pockets, closing the first and second mold portions to define a mold cavity that defines the outer surface of the air assist passageway and injector pockets, inserting at least one air assist passageway pin through apertures in the injector pockets to define an interior surface of the air assist passageway that extends through and couples the injector pockets, filling the mold cavity with molten material, solidifying the molten material to form a solid part having the air assist passageway and injector pockets, withdrawing the at least one air assist passageway pin from the solid part, and opening the mold. The method may include the steps of inserting at least one additional air assist passageway pin through at least one aperture in another of the injector pockets, and withdrawing the at least one additional air assist passageway pin from the solid part. The method may further include the step of engaging an end of the at least one air assist passageway pin with an end of the at least one additional air assist passageway pin to form an elongate tubular body therefrom. The method may further include the step of plugging an open end of an air assist passageway in the solid part, or plugging a second open end of the air assist passageway in the solid art. The step of inserting may include the step of inserting the at least one air assist passageway pin through apertures in the injector pocket bosses such that at least a length of the pin is completely surrounded by the injector pocket bosses. The step of inserting may also include the step of inserting the at least one air assist passageway pin through a longitudinal axis of the injector pocket bosses.

In accordance with the second embodiment of the invention, a method of manufacturing an intake manifold for a "V" style internal combustion engine having first and second banks of cylinders, the manifold including, for each bank of cylinders, a plurality of fuel injector pockets and an air assist passageway extending between the plurality of fuel injector pockets, the manifold also including a plurality of induction air passageways, each of the plurality of induction air passageways being associated with each of the plurality of fuel injector pockets, where the method includes the steps of providing first and second closeable and openable mold portions configured to define when closed an outer surface of the intake manifold including the outer surface of the fuel injector pockets, the induction air passageways, and the air assist passageways, wherein the second mold portion has a plurality of inwardly extending injector pocket bosses defining an inner surface of each of the plurality of fuel injector pockets, closing the first and second mold portions to create a mold cavity defining the outer surface of the manifold, inserting the first air assist passageway pin through apertures in a first plurality of injector pocket bosses to define an interior surface of an air assist passageway that extends through and couples a first plurality of injector pockets in the first bank of cylinders, inserting a second air assist passageway pin through apertures in a second plurality of injector pocket bosses to define an interior surface of an air assist passageway that extends through and couples a second plurality of injector pockets in the second bank of cylinders, filling the mold cavity with molten material, solidifying the molten material to form the manifold, withdrawing the first and second air assist passageway pins from the manifold, and opening the mold. The method may also include inserting a third air assist passageway pin through an aperture in another of the injector pockets, where the another of the injector pockets is disposed to feed another cylinder in the first bank of cylinders, inserting a fourth air assist passageway pin through an aperture in yet another of the injector pockets, said yet another of the injector pockets being disposed to feed another cylinder in the second bank of cylinders, and withdrawing the third and fourth air assist passageway pins from the solidified manifold. The method may also include the step of engaging an end of the first air assist passageway pin with an end of the third air assist passageway pin to form a first elongate tubular body therefrom. The method may include the step of engaging an end of the second air assist passageway pin with an end of the fourth air passageway pin to form a second elongate tubular body therefrom. The method may also include the step of plugging an open end of an air assist passageway in the manifold defined for the first bank of cylinders. It may include plugging an open end of an air assist passageway in the manifold defined for the second bank of cylinders. The step of inserting a first air assist passageway pin may include the step of inserting the first air assist passageway pin through apertures in the injector pocket bosses such that at least a portion of the length of the first pin is completely surrounded by each of the injector pocket bosses through which it passes. The method may also include the step of inserting a second air assist passageway pin through apertures in the injector pocket bosses such that at least a portion of a length of the second pin is completely surrounded by each of the injector pocket bosses through which it passes.

Other principal features and advantages of the invention will become apparent to those skilled in the art upon review of the following drawings, the detailed description and the appended claims.

BRIEF DESCRIPTION OF THE DRAWINGS

FIG. 1 is a top view of an air intake manifold for a V-8 engine having two banks of cylinders, each having an air assist passageway feeding four injectors and a center feed of the air assist passageway;

FIG. 2 is a side view of the air intake manifold of FIG. 1, showing the air assist passageway of a single bank of cylinders;

FIG. 3 is a cross-sectional view of the manifold of FIG. 1 taken at Section 3—3 in FIG. 1 and showing the curvature of the internal plenum;

FIG. 4 is a cross sectional view of the manifold of FIG. 1 taken at Section 4—4 in FIG. 1 and showing the air assist passageway and the injector pockets for one bank of cylinders in cross section;

FIG. 5 is a partial cross-sectional view of the manifold of FIG. 3 taken at Section 5—5 and showing details of the injector pocket and the intersection of the air assist passageway with the center line of the injector pockets;

Figure 6:
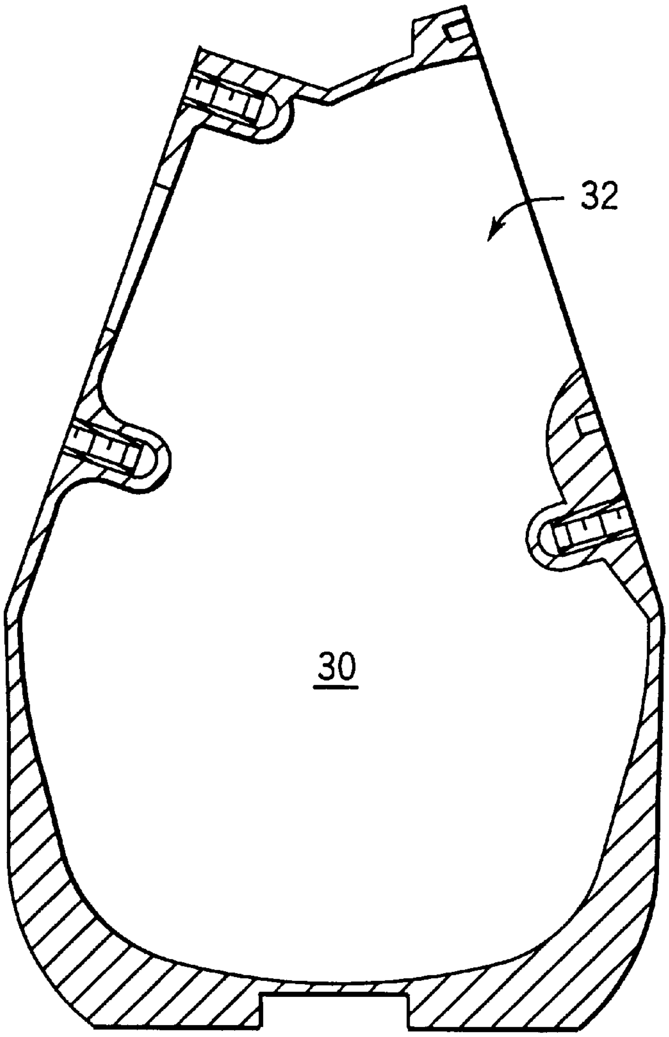
FIG. 6 is a cross-sectional view of the manifold of FIG. 1 taken at Section 6—6 and showing the combustion air entrance to the plenum of the manifold.
Figure 7:
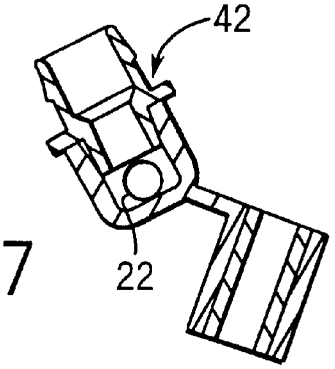
FIG. 7 is a cross-sectional view of the manifold of FIG. 1 at Section 7—7 and showing the center air assist feed into the air assist passageway.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, an intake manifold 12 for a V-8 engine is shown. Fuel injectors are fitted into fuel injector pockets 18 formed in manifold 12 and communicate with induction air passageways 20 that supply combustion air to the engine 10. Each bank of the manifold has an air assist passageway 22 that extends the length of each bank, and is in fluid communication with each of the injector pockets in their respective banks of cylinders. An air assist port 42 is located between the inner two cylinders of each bank and is supplied with assist air under pressure.

The induction air passageways 20 supply substantially all the combustion air to their respective cylinders. They extend from a central portion or plenum 30 of intake manifold 12. The plenum receives substantially all the combustion air required by the engine through an opening 32, and serves to distribute it to each of the induction air passageways 20, which collectively supply substantially all the combustion air to the engine in equal amounts. The air induction passageways have substantially the same cross-sectional area and each conducts substantially the same amount of combustion air.

Since manifold 12 is designed for a V-8 engine, there are two sets of induction air passageways 20, one for each bank of cylinders, each set having four passageways, and each passageway being associated with one of the cylinders in that bank. FIG. 5 illustrates the arrangement of a typical set of injector pockets together with its associated air assist passageway. Each set of induction air passageways has an associated air assist passageway 22 integrally formed in the manifold that is in fluid communication with all the fuel injectors 16 of that set. While FIG. 5 shows only a single fuel injector 16 in its associated fuel injector pocket 18 it is understood that each of the injector pockets described herein will be similarly equipped.

The air assist passageway for each set of induction air passageways is circular, and has a longitudinal axis 34 that extends through and intersects the fuel injector pockets 18 in each set. The air assist passageway and its longitudinal axis preferably intersects the fuel injector pockets at a right angle to the longitudinal central axis 36 of the fuel injector pockets to provide for better distribution of the assist air. As best shown in FIG. 5, which shows air assist passageway 22 end-on, the air assist passageway preferably intersects longitudinal axis 36 of the fuel injector pockets 18. Preferably, and as shown here, longitudinal axis 34 substantially intersects longitudinal central axis 36 of the fuel injector pockets. Indeed the intersection of the air assist passageways and the fuel injector pockets is preferably so complete that a separate and distinct entrance opening an exit opening of the air assist passageway into and out of the fuel injector pocket is formed. The fuel injector pockets in each bank are preferably arranged in a substantially straight line, and hence the air assist passageway 22 (which is preferably straight as well) intersects each fuel injector pocket at the same location within each pocket.

Fuel injectors 16 are supported in pockets 18 on two flexible seals, shown here as "O"-rings 38, that define air assist chambers 40 between the outer surface of the fuel injectors 16 and the inner surface of fuel injector pockets 18. These seals both support the fuel injector and prevent the pressurized assist air from escaping the fuel injector pocket. The air assist passageways enter into and exit the fuel injector pockets in the air assist chambers 40 at a point between the upper and lower flexible seals 38. In this manner, the assist air is held within the injector pockets and is prevented from leaking out.

Air is introduced into the air assist passageway of the FIG. 1 manifold at a point between the two inner fuel injectors on each bank. As best shown in FIGS. 1 and 4 an air assist port 42 is provided in the air assist passageway through which assist air under pressure is supplied to the air assist passageway. This port may be connected to an assist air line by any of a variety of conventional means well known to those skilled in the art. As shown, a single port is provided through which air is introduced. Once introduced into air assist port 42, the air is diverted in two directions, following both a leftward and a rightward path, each path directing the assist air toward a pair of associated cylinders in the bank.

While the air assist port 42 of the preferred embodiment is disposed between two pairs of injector pockets and thus feeds equal numbers of cylinders on each path, it can be disposed between any two adjacent injector pockets and still provide substantial advantages over the prior art arrangement in which assist air was supplied only to one end of the air assist passageway.

Figure 11:
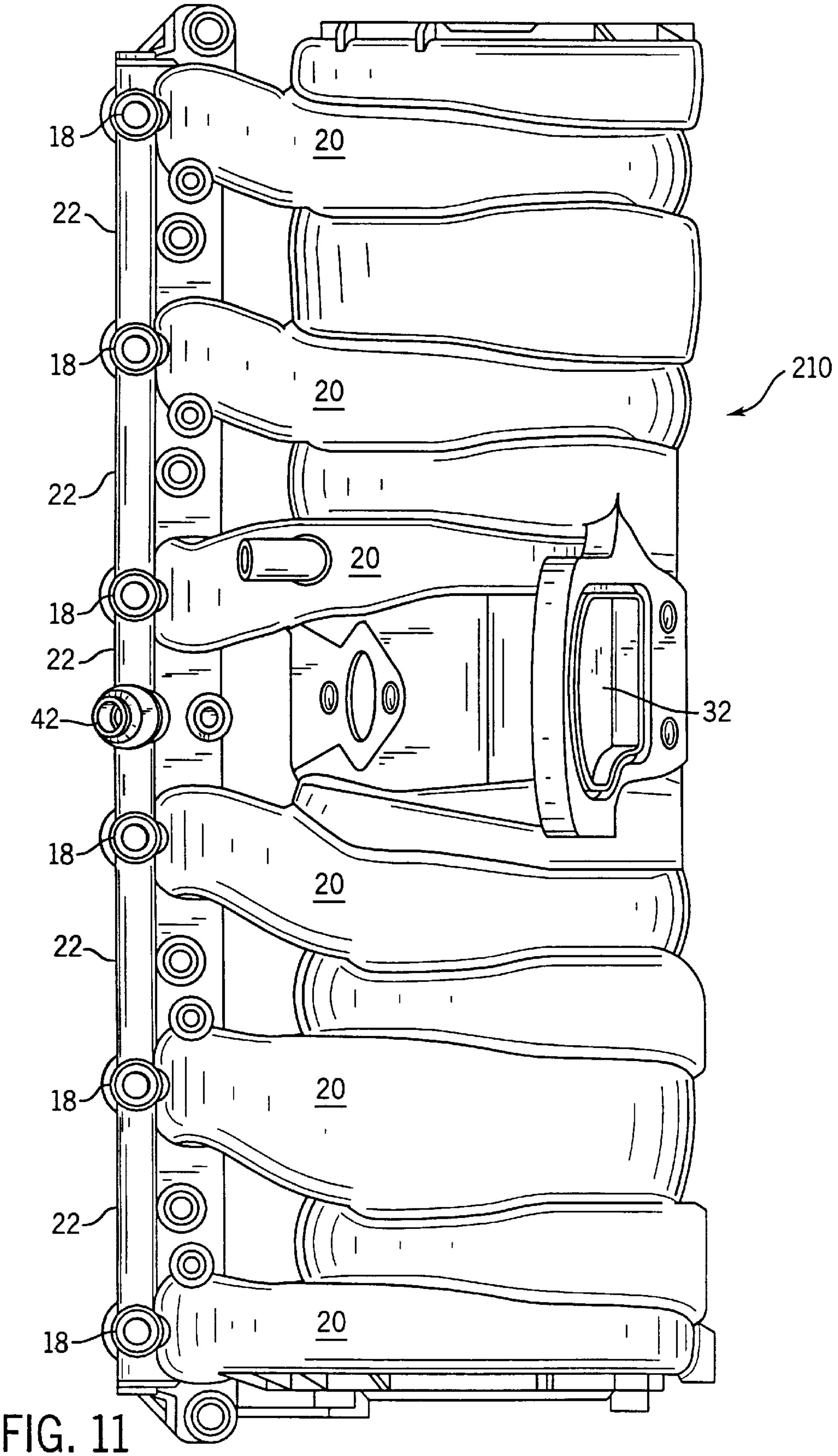
FIG. 11 is a top view of a manifold of a straight six cylinder engine with a single bank of cylinders and an integral air assist passageway integrally formed with the manifold in the same manner as described in accordance with the preceding figures.

For example, FIG. 11 shows an intake manifold 210 for a straight 6 cylinder engine having a single air assist passageway that feeds all six injector pockets for each of the cylinders of the engine. In this case, the air assist port is disposed between two groups of three cylinders (and hence between two groups of three induction air passageways and their corresponding injector pockets) in the air assist passageway. In all other respects, other than the arrangement of cylinders in a single bank, the system is the same as that described herein for the manifold of FIG. 1.

Figure 12:
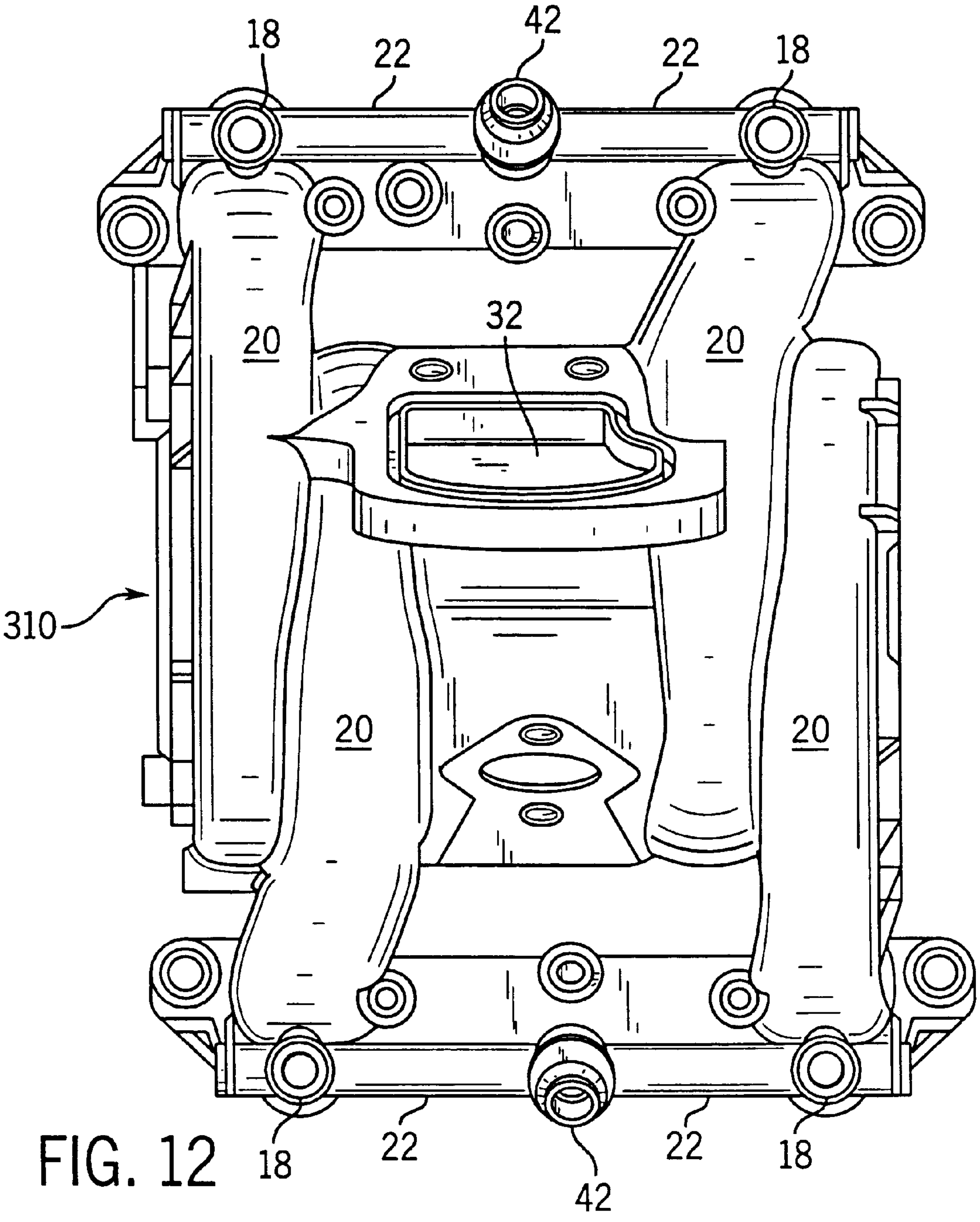
FIG. 12 is a top view of a manifold of a V-4 engine with two banks of cylinders each having an integral air assist passageway integrally formed with the manifold in the same manner as described in accordance with the preceding figures.

As a further example, FIG. 12 shows an intake manifold 310 for a V-4 engine having two banks of cylinders, each bank having an air assist passageway to feed the two cylinders in that bank. In this case, the air assist port is disposed between each of the two cylinders (and hence between each of two induction air passageways and their associated injector pockets) in each bank. In all other respects, other than the reduction in the number of cylinders, induction air passageways and associated injectors in each bank, the system is the same as that described herein for the manifold of FIG. 1.

Figure 13:
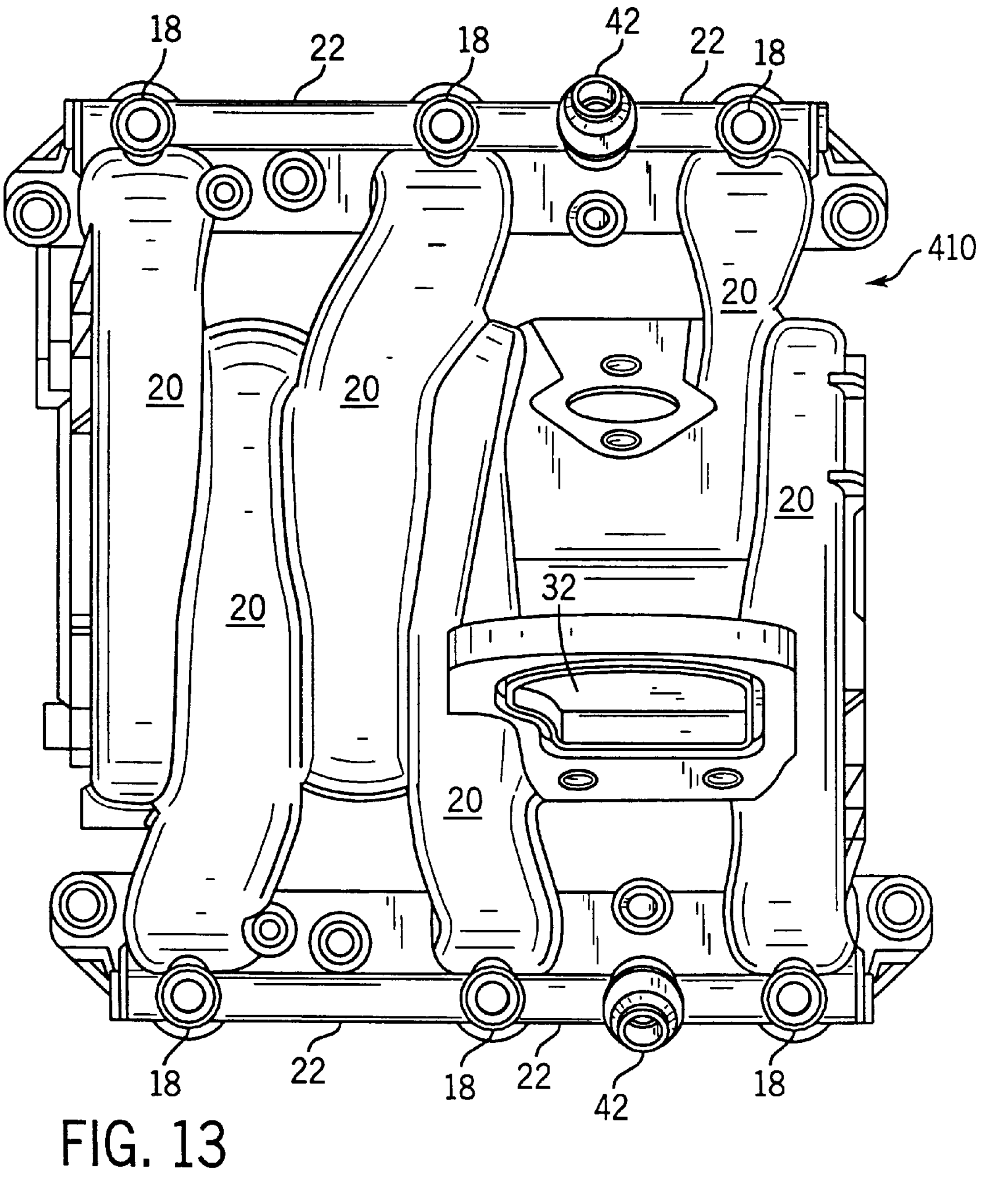
FIG. 13 is a top view of a manifold of a V-6 engine with two banks of cylinders and an integral air assist passageway integrally formed with the manifold in the same manner as described in accordance with the preceding figures.

As yet another example, FIG. 13 shows an intake manifold 410 for a V-6 engine having two banks of cylinders, each bank having an air assist passageway to feed the three cylinders in that bank. In this case, the air assist port is disposed between two of the three cylinders in each bank (and hence between two induction air passageways and their associated injector pockets), with one cylinder (and passageway and associated pocket) on one side of the air assist port and two cylinders (and their associated induction air passageways and associated injectors) on the other side of the air assist port. In all other respects, other than the reduction in the number of cylinders, induction air passageways and associated injector pockets in each bank, the system is the same as that described herein for the manifold of FIG. 1.

Figure 8:
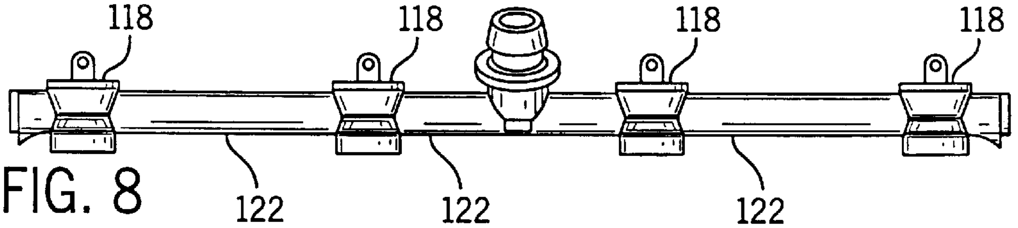
FIG. 8 shown an alternative arrangement of the air assist passageway of the FIG. 1 manifold formed as a separate unit and not integral with the manifold of FIG. 1.
Figure 9:
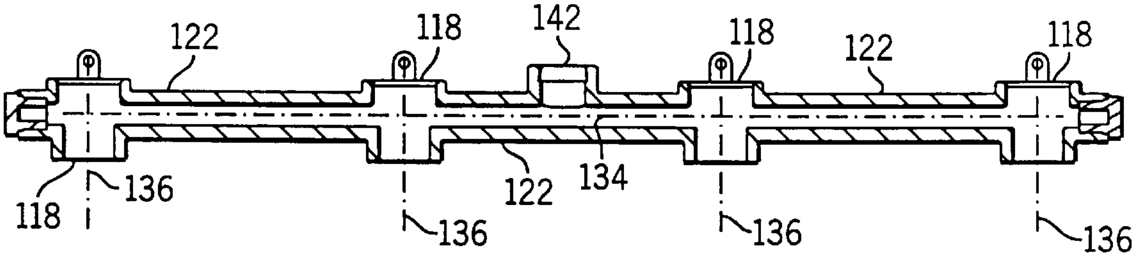
FIG. 9 is a cross-sectional view of the separate air assist passageway of FIG. 8 wherein the cutting plane is defined by the center lines of the injector pockets and the center line of the air assist line.
Figure 10:
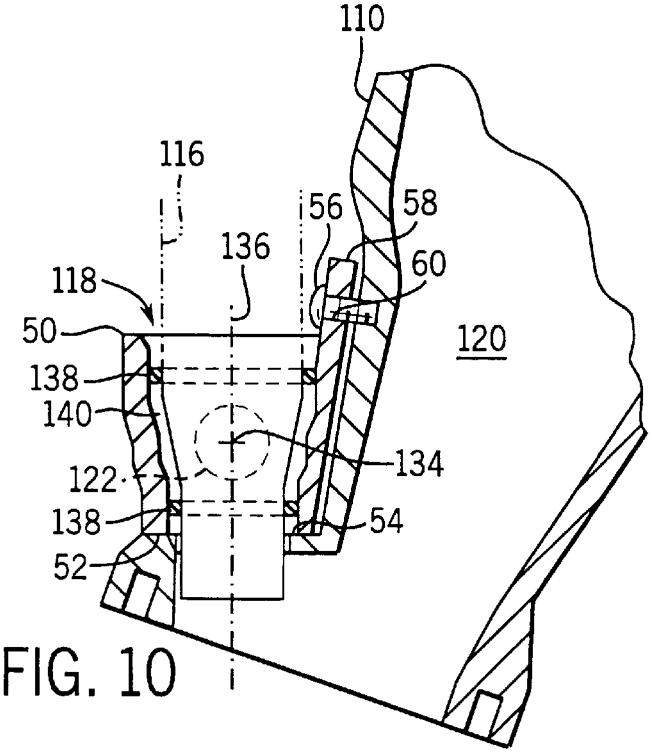
FIG. 10 is a cross section of the separate air assist passageway of FIGS. 8–9 taken at Section 10—10 in FIG. 9 and showing a partial cross section of the manifold in FIG. 1 but having a separate air assist passageway and the method of attaching the separate air assist passageway to the manifold.

While the air assist passageways and injector pockets are preferably formed integrally with the manifold as shown in the arrangements of FIGS. 1–7 and 11–13, they can be separately formed and attached to the manifold at a later date. This has the advantage of permitting the air assist passageway and the manifold to be made more precisely and positioned more accurately. In this arrangement, the air assist passageway and injector pockets would preferably be removably fastened to the intake manifold itself. FIGS. 8–10 illustrate such an arrangement.

FIGS. 8–10 illustrate an air assist rail for a manifold 110 similar to manifold 12, but having a separate air assist passageway formed as a separate air assist rail and removably attached to the manifold. In the preferred embodiment manifold 110 to which they are attached is the same in every respect to that of the FIG. 1 manifold 12, but does not have the integral air assist passageway 22 or integral injector pockets 18 as shown most clearly in FIG. 5. Instead, an air assist rail 50 with associated injector pockets 118 is separately formed and attached to the modified manifold 110 as best shown in FIG. 10. As with the example of manifold 12 of FIG. 1, manifold 110 is designed for a V-8 engine, and has two sets of induction air passageways 120, one for each bank of cylinders, each set having four passageways 120, and each passageway being associated with one of the cylinders in that bank. FIG. 9 illustrates the arrangement of a typical set of injector pockets together with its associated air assist passageway 122. Each set of induction air passageways 120 on each bank has an associated air assist rail 50 that is in fluid communication with all the fuel injectors 16 of that set. While FIG. 9 shows only a single fuel injector 16 in its associated fuel injector pocket 118 it is understood that each of the injector pockets described herein will be similarly equipped.

The air assist passageway 122 for each set of induction air passageways 120 is circular, and has a longitudinal axis 134 that extends through and intersects the fuel injector pockets 118 in each set. Each air assist passageway 122 and its longitudinal axis 134 preferably intersects the fuel injector pockets at a right angle to the longitudinal central axis 136 of its associated fuel injector pockets 118 to provide for better distribution of the assist air. As best shown in FIG. 9, which shows the air assist passageway 122 end-on, air assist passageway 122 preferably intersects longitudinal axis 136 of the fuel injector pockets 118. Preferably, and as shown here, longitudinal axis 134 substantially intersects longitudinal central axis 136 of the fuel injector pockets. Indeed, the intersection of the air assist passageways and the fuel injector pockets is preferably so complete that a separate and distinct entrance opening and exit opening of the air assist passageway into and out of the fuel injector pocket is formed. Fuel injector pockets 118 in each bank are preferably arranged in a substantially straight line, and hence their associated air assist passageway 122 (which is preferably straight as well) intersects each of its fuel injector pockets 118 at the same location within each pocket.

Fuel injectors 16 are supported in pockets 118 on two flexible seals, shown here as “O”-rings 138, that define air assist chambers 140 between the outer surface of the fuel injectors 16 and the inner surface of fuel injector pockets 118. These seals both support the fuel injector and prevent the pressurized assist air from escaping the fuel injector pocket. Air assist passageways 122 enter into and exit fuel injector pockets 118 in air assist chambers 140 at a point between the upper and lower flexible seals 138. In this manner, the assist air is held within the injector pockets and is prevented from leaking out.

Air is introduced into air assist passageway of the air assist rail 50 at a point between the two inner fuel injectors on each bank. As best shown in FIG. 9 an air assist port 142 (similarly formed and constructed in all respects to air assist port 42), is provided in air assist passageway 122. It is through this port that assist air under pressure is supplied to air assist passageway 122. This port may be connected to an assist air line by any of a variety of conventional means well known to those skilled in the art. As shown, a single port is provided through which air is introduced. Once introduced into air assist port 142, the air is diverted in two directions, following both a leftward and a rightward path, each path directing the assist air toward a pair of associated cylinders in the bank of cylinders associated with that air assist passageway.

Unlike the examples of FIGS. 1–7 and 11–13, the air assist rail is separable from the manifold. To provide an air tight seal with the manifold, each pocket 118 on the air assist rail has an associated circular sealing surface 52 extending from the bottom of injector pockets 118 that abuts a similarly circular opening 54 on manifold 110. A sealing material (not shown) such as sealing rings or gaskets may be disposed between each of these surfaces 52 and associated openings 54. Air assist rail 50 is fixed to manifold 110 using a plurality of fasteners, preferably removable screw-type fasteners, and most preferably (and as shown here) machine screws 56. In the preferred embodiment, each injector pocket is provided with an ear 58 that extends upward from the pocket and has an opening 60 through which the fastener is inserted. The fastener is screwed into manifold 110 as shown in FIG. 10, and air assist rail 50 is thereby fixed to manifold 110.

While air assist port 142 of the preferred embodiment is disposed between two pairs of injector pockets and thus feeds equal numbers of cylinders on each path, it can be disposed between any two adjacent injector pockets 118 and still provide substantial advantages over the prior art arrangement in which assist air was supplied only to one end of the air assist passageway.

As in the examples of FIGS. 11–13, which illustrate an air assist passageway formed integrally with a manifold, air assist rail 50 of FIGS. 8–10 may be used with a variety of engine arrangements, including a straight six engine, a V-4 engine, and a V-6 engine and is disposed in a similar location on the manifolds of these engines as the assist air passageways of FIGS. 11–13.

Figure 14:
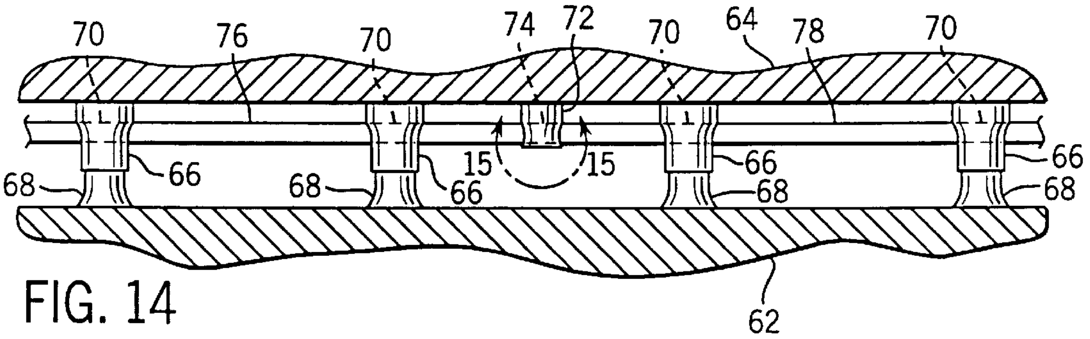
FIG. 14 is a partial cross-sectional view of a mold defining the air assist passageway and injector pockets for the manifold of FIG. 1 or the assist air rail of FIG. 8 showing the fuel injector pocket bosses and the air assist port boss extending from an upper mold portion that define the fuel injector pockets and the air assist port, respectively, and pins extending laterally through the bosses that define the air assist passageway connecting the bosses, where the portions of the upper and lower mold portions that define the outer surface of the air assist passageway and the injector pockets are removed for clarity to show the arrangement of the bosses and pins.
Figure 15:
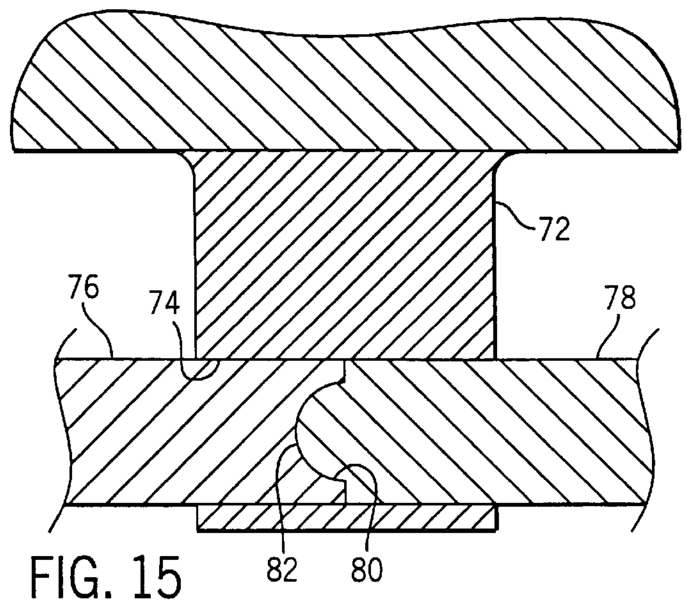
FIG. 15 is a cross sectional view of the mold arrangement of FIG. 14 taken at Section 15—15 and showing the air assist port boss and the air assist passageway pins in cross section and including details of a recess and protrusion on the pins that align them with respect to each other.

In all the foregoing embodiments, the air assist passageways and the fuel injector pockets are preferably formed in a single molding operation, whether they are formed as a part of the entire manifold 12, 210, 310 or 410, or whether they are formed as a separate air assist rail 50. FIGS. 14–15 illustrate the preferred arrangement. For clarity, the mass of the mold cavity that forms the outside surface of the air assist passageways and the fuel injector pockets has been removed, and only the salient parts—the bosses that form the fuel injector pockets and the pins that form the air assist passageways—are shown in detail. The rest of the mold forming the outer surface of manifold 12, 210, 310 or 410 (if formed integrally with the manifold) or the air assist rails 50 (if formed separate from the manifold) are configured in a conventional manner well known to those skilled in the art. The arrangement of mold, bosses and pins described below can be used to form the injector pockets and air assist passageways of either the unitary manifold (best shown in FIGS. 1, and 11–13), or the separate air assist rail 50 (best shown in FIG. 8).

A first injection mold portion 62 and a second injection mold portion 64 collectively define the outer surface of the injector pockets and the air assist passageways. First mold portion 62 forms a portion of the lower outer surface of the manifold 12, 210, 310 or 410, or air assist rail 50 if it is being formed separately. Second mold portion 64 forms the upper outer surface of the manifold 12, 210, 310 or 410, or air assist rail 50 if it is being formed separately. First and second mold portions 62 and 64 abut one another to collectively define the mold cavity that shapes the outer surface of the manifolds or fuel rail. Second mold portion 64 has a plurality of injector pocket bosses 66 extending into the mold cavity from an interior surface thereof to form an upper portion of the injector bosses. First mold portion also has a plurality of bosses 68 that abut bosses 66 to form a bottom portion of fuel injector pockets. Bosses 66, 68 substantially define the interior surface of the fuel injector pockets. Bosses 66, 68 are preferably arranged in a straight line and have parallel longitudinal axes, thus providing fuel injector pockets in the finished manifold or air assist rail that are parallel. Each boss 66 has a passageway 70 defined therethrough. These passageways are coaxial to thereby define a continuous and hollow cylindrical opening extending through all the bosses 66.

An additional air assist port boss 72 also extends into the mold cavity and has a passageway 74 extending therethrough that is coaxial with the passageways 70 extending through each of the bosses 66 that form the interior of the injector pockets. Thus, passageways 70 that pass through bosses 66 and passageway 74 that pass through boss 72 define a single tubular passageway extending through all the bosses 66 and 72.

The passageways 70 and 74 are configured to receive and support two air assist passageway pins 76 and 78 that are inserted into the mold cavity. Pins 76 and 78 are preferably circular and meet in the middle, one of the pins having a recess 80 and the other having a protrusion 82 that, when properly abutted and mated, cause the pins to collectively define a continuous cylindrical body. The protrusion and recess keep their respective pins in alignment during the injection molding process to thereby form a continuous air assist passageway extending through all the injector pockets. Pins 76 and 78 collectively define the interior surface of the air assist passageway extending between the fuel injector pockets, as shown in FIGS. 1–13.

When a manifold is formed for an engine having two banks of cylinders, there will be two sets of fuel injector pocket bosses arranged as described above, each of the sets having its two associated air assist passageway pins. The number of fuel injector pocket bosses will vary with the number of cylinders in the engine.

In operation, first mold portion 62 and second mold portion 64 are closed to define a mold cavity. This cavity defines the outer surface of an intake manifold with integral air assist passageway and fuel injector pockets, or an assist air rail if it is to be formed separately. Once closed, air assist passageway pins 76 and 78 are inserted into the mold cavity and through the injector pocket bosses that extend inwardly into the mold cavity from second mold portion. The pins are inserted through the bosses' passageways until they abut each other, engaging their mating protrusions and recesses. As shown in FIG. 14, at least a portion of the length of each pin 76, 78 is completely surrounded by the fuel injector pockets through which it passes. This provides 360 degree support for the pins and reduces the chance that they will be forced away from the pocket bosses when the mold cavity is filled, as they might be if they merely touched the sides of the pocket bosses or fitted into a shallow indentation in the sides of the pocket bosses. The mold is then filled with a material such as plastic, preferably mineral reinforced, and allowed to cool. The pins are then withdrawn from the mold cavity and the cavity is opened. Once the cavity is opened, the manifold or air assist rail can be removed and the air assist port can be drilled or milled if it was not formed as a part of the molding process. The two open ends of each air assist passageway defined by the pins are then plugged to prevent assist air from leaking out in use.

The manifolds and air assist rails are preferably made from plastic, more preferably a mineral fiber reinforced plastic to provide dimensional stability and strength in the hot under-hood environments experienced by contemporary internal combustion engines. Traditionally, intake manifolds have been made of light metals, such as aluminum or magnesium alloys, which would be satisfactory in the present application but are not preferred due to their weight.

The flexible seals, while shown herein as O-rings, can be rectangular, oval or lobed seals depending upon the preferred degree of sealing.

Thus, it should be apparent that there has been provided in accordance with the present invention a method for manufacturing air assist passageways and injector pockets that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of manufacturing air assist passageways and injector pockets, comprising the steps of:

providing first and second closeable and openable mold portions configured to define an outer surface of an air assist passageway and injector pockets, wherein the air assist passageway extends between and couples the injector pockets and further wherein the second mold portion has a plurality of inwardly extending bosses defining an inner surface of each of the plurality of injector pockets;

closing said first and second mold portions to define a mold cavity that defines the outer surface of the air assist passageway and injector pockets;

inserting at least one air assist passageway pin through apertures in the injector pockets to define an interior surface of the air assist passageway that extends through and couples the injector pockets;

filling the mold cavity with molten material;

solidifying the molten material to form a solid part having the air assist passageway and injector pockets;

withdrawing the at least one air assist passageway pin from the solid part; and opening the mold.

2. The method of claim 1, further comprising the steps of:

inserting at least one additional air assist passageway pin through at least one aperture in another of the injector pockets; and withdrawing the at least one additional air assist passageway pin from the solid part.

3. The method of claim 2, further comprising the step of:

engaging an end of the at least one air assist passageway pin with an end of the at least one additional air assist passageway pin to form an elongate tubular body therefrom.

4. The method of claim 3, further comprising the step of plugging an open end of the air assist passageway in the solid part.

5. The method of claim 4, further comprising the step of plugging another open end of the air assist passageway in the solid part.

6. The method of claim 1, wherein the step of inserting comprises the step of inserting the at least one air assist passageway pin through apertures in the injector pocket bosses such that at least a length of the pin is completely surrounded by the injector pocket bosses.

7. The method of claim 6, wherein the step of inserting includes the step of inserting the at least one air assist passageway pin through a longitudinal axis of the injector pocket bosses.

8. A method of manufacturing an intake manifold for a "V" style internal combustion engine having first and second banks of cylinders, the manifold including, for each bank of cylinders, a plurality of fuel injector pockets and an air assist passageway extending between the plurality of fuel injector pockets, the manifold also including a plurality of induction air passageways, each of the plurality of induction air passageways being associated with each of the plurality of fuel injector pockets, the method comprising the steps of:

providing first and second closeable and openable mold portions configured to define when closed an outer surface of the intake manifold including the outer surface of the fuel injector pockets, the induction air passageways, and the air assist passageways, wherein the second mold portion has a plurality of inwardly extending injector pocket bosses defining an inner surface of each of the plurality of fuel injector pockets;

closing said first and second mold portions to create a mold cavity defining the outer surface of the manifold;

inserting a first air assist passageway pin through apertures in a first plurality of injector pocket bosses to define an interior surface of an air assist passageway that extends through and couples a first plurality of injector pockets in the first bank of cylinders;

inserting a second air assist passageway pin through apertures in a second plurality of injector pocket bosses to define an interior surface of an air assist passageway that extends through and couples a second plurality of injector pockets in the second bank of cylinders;

filling the mold cavity with molten material;

solidifying the molten material to form the manifold;

withdrawing the first and second air assist passageway pins from the manifold; and opening the mold.

9. The method of claim 8, further comprising the steps of:

inserting a third air assist passageway pin through an aperture in another of the injector pockets, said another of the injector pockets being disposed to feed another cylinder in the first bank of cylinders;

inserting a fourth air assist passageway pin through an aperture in yet another of the injector pockets, said yet another of the injector pockets being disposed to feed another cylinder in the second bank of cylinders; and withdrawing the third and fourth air assist passageway pins from the solidified manifold.

10. The method of claim 9, further comprising the step of:

engaging an end of the first air assist passageway pin with an end of the third air assist passageway pin to form a first elongate tubular body therefrom.

11. The method of claim 10, further comprising the step of:

engaging an end of the second air assist passageway pin with an end of the fourth air assist passageway pin to form a second elongate tubular body therefrom.

12. The method of claim 11, further comprising the steps of:

plugging an open end of an air assist passageway in the manifold defined for the first bank of cylinders.

13. The method of claim 12, further comprising the steps of:

plugging an open end of an air assist passageway in the manifold defined for the second bank of cylinders.

14. The method of claim 8, wherein the step of inserting a first air assist passageway pin comprises the step of inserting the first air assist passageway pin through apertures in the injector pocket bosses such that at least a portion of a length of the first pin is completely surrounded by each of the injector pocket bosses through which it passes.

15. The method of claim 14, wherein the step of inserting a second air assist passageway pin comprises the step of inserting the second air assist passageway pin through apertures in the injector pocket bosses such that at least a portion of a length of the second pin is completely surrounded by each of the injector pocket bosses through which it passes.

* * * * *